3,428,465
PREPARATION OF MOLDS
Gordon Donald McLeod, Adrian, Mich., assignor to Stauffer Chemical Company, New York, N.Y., a corporation of Delaware
No Drawing. Filed Oct. 19, 1965, Ser. No. 498,123
U.S. Cl. 106—38.35       17 Claims
Int. Cl. C04b 35/16

ABSTRACT OF THE DISCLOSURE

Guanidine carbonate is included in a silicate binder-refractory mixture to catalyze the curing thereof.

---

This invention relates to the preparation of molds for casting castable substances, especially metals. More particularly, the invention concerns a method for fabricating molds of refractory materials which assures consistent, reproducible results.

Molds of the type involved herein are fabricated using a mixture of refractory material and a suitable binder therefor, commonly a pre-hydrolyzed tetraalkoxysilane as tetraethoxysilane. Using such a binder in either the ceramic shell process, which utilizes the lost wax principle or the permanent pattern (cope and drag) process, it is frequently necessary as a practical matter to employ along with the binder a material called a gelation agent which operates to assist in the setting of the binder-refractory mixture. The mechanism of the reaction whereby the gelation agent performs the indicated function is not understood in full detail in a chemical sense, but it is nevertheless clear that the effect of such agent is catalytic in that it promotes and hastens curing of the binder.

Heretofore there have been used as gelation agents in the permanent pattern process substances such as ethyl phosphate, magnesium oxide, magnesium phosphate, and certain colloidal suspensions of silica. Molds so produced have been found lacking in point of "green strength" which is to say that prior to firing they must be handled with great care because of their frangibility. Also, some of these molds show a tendency to warp either on the pattern or subsequently.

Another disadvantage of the prior gelation agents applied in the permanent pattern process resides in the fact that it is extremely difficult to achieve reproducible gel or curing times therewith as is necessary in mold preparation by mass production methods, including automation. Apart from this, many of these agents suffer from the disadvantage of instability, especially in storage when premixed with refractory material. With some, actual reaction with the refractory or the metal of the pattern or the cast metal has been experienced—obviously an undesideratum.

In the ceramic shell process, gaseous ammonia has been employed with fair success to speed gelation, but the difficulties involved in the handling of a gaseous material, applied for such a purpose, are self-evident.

The present invention has as its principle objects to overcome the deficiencies, faults and complications above indicated.

The invention herein having particular relation to the ceramic shell process and the permanent pattern or cope and drag process, it would seem in order to briefly describe these as conventionally practiced. In the ceramic shell process, a wax pattern is first coated with a slurry containing a selected refractory material and a selected binder. Following this first coating, which is accomplished by dipping the wax pattern (or pattern cluster) in the slurry, the pattern is immersed in a fluidized bed of a refractory having a relatively large particle size. This results in the deposition of a "stucco" over the first coating. The process as described is continued with repeated alternate dippings in the slurry and the fluidized bed until a desired thickness of mold material is attained, whereafter the mold is fired. Following each application of the stucco layer it is necessary that the mold be allowed to dry for a period which may vary from one-half hour to several days depending on the binder. In some installations, as previously suggested, this time is reduced by exposure of the mold to an atmosphere of gaseous ammonia.

In the permanent pattern molding process, which is adapted to the formation of relatively uncomplicated molds, the refractory-binder mixture or investment plus gelation agent is simply poured over the metal pattern with brushing to assure wetting of the entire face of the pattern and to prevent the formation of bubbles. The mixture is left on the pattern for a period of time which has been determined empirically. Upon removal from the pattern the green mold is subjected to firing as in the case of the ceramic shell process. As previously indicated, the stripping of the mold from the pattern has required extreme care because of the low green strength of the mold. Even with the most rigid controls, the breakage rate has been unduly high.

The present invention is predicated on the discovery that quanidine carbonate possesses unique properties which peculiarly adapt it for use as the gelation agent in the above described and other mold making procedures when the binder employed is a pre-hydrolyzed tetraalkoxysilane. Thus, using guanidine carbonate in conjunction with such a binder it has been found possible to gel the investments to high green strength within a time period which is readily predetermined for any given binder-refractory mixture. The guanidine carbonate has exhibited no tendency to react with metals of which permanent patterns are normally formed and since it decomposes at firing temperatures without leaving a residue there can be no contamination of the cast metal.

In the practice of the invention, the guanidine carbonate is applied as a refractory coating, being deposited on the refractory from aqueous solution. The concentration of the solution is not critical but an 8–12% solution has been used with good effect and is recommended. The solution is added to the refractory in a quantity providing from about 0.1 to about 5 weight percent guanidine carbonate based on total refractory (considering the guanidine carbonate as a component of the refractory material). The higher the degree of hydrolysis and the $SiO_2$ content of the tetraalkoxysilane binder the less the amount of guanidine carbonate required to gel or cure the refractory mixture to adequate green strength within the selected time limit. In the permanent pattern process the guanidine carbonate is preferably applied in an amount representing from .075 to 1.25 percent of the total weight of the refractory; whereas in the case of the ceramic shell process, the preferable range is .05 to 3.5 percent.

The binders involved herein are readily prepared by adding alcohol and aqueous acid to the tetraalkoxysilane it is desired to employ. Ordinarily the alcohol comprises the same alkyl group as is comprised in the tetraalkoxysilane but this is not essential. The aqueous acid is usually aqueous hydrochloric acid but other strong acids as sulfuric and phosphoric acids are applicable. It is necessary that the acid be employed in a quantity such that the binder as applied for the purposes of the invention has a pH between 1.5 and 3.

As indicated hereinbefore, it is preferred to employ tetraethoxysilane i.e. tetraethylorthosilicate as the tetraalkoxysilane component in the preparation of the binder. Among other applicable tetraalkoxysilanes may be mentioned: tetramethoxysilane, tetraisopropoxysilane, tetrabutoxysilane, etc. Any of these may be employed alone or in admixture with one or more of the others. Polymers and copolymers as well as monomers can be used in the acid-catalyzed reaction yielding the binder; indeed the preferred material is polymerized ethylorthosilicate having an $SiO_2$ content of approximately 40%.

The tetraalkoxysilane material is employed in a quantity providing from about 6 to about 35 percent, more preferably 9 to 18 percent, silica in the binder. It should be noted that the higher the $SiO_2$ content the higher the green strength of the mold and the higher its strength after firing.

The quantity of water added to the binder mixture through the medium of the aqueous acid may be varied substantially depending upon the degree of hydrolysis sought. In general, from 4.5 to 20 parts water are employed per 100 parts tetraalkoxysilane.

The alcohol-tetraalkoxysilane ratio in the binder mixture may lie anywhere within the range 1:4–4:1. Usually, however, the alcohol is applied in 1–1.5:1 ratio. The alcohol serves as a diluent, facilitating mixing of the binder with the refractory, and also prevents premature gelation in the pot. In addition, the alcohol promotes rapid drying of the wet mold material.

Following the intermixing of the tetraalkoxysilane with the alcohol and aqueous acid, the hydrolysis is allowed to proceed to equilibrium. This may require from ½ to 4 days. For the purposes of the present invention it is best if the extent of the hydrolysis is not less than 50%, which corresponds to 0.25 mole of water per mole of alkoxy group. A binder less hydrolyzed requires too long a working time for most applications and generally results in a mold having inadequate green strength. The optimum degree of hydrolysis in the majority of applications is from about 65 to 95 percent. If the hydrolysis approaches 100% shelflife problems may arise where the binder is prepared for later rather than immediate use.

It has been determined that optimum results, particularly in the case of the permanent pattern process, are achieved when the tetraalkoxysilane is hydrolyzed to the extent of about 75–85%. This makes possible a working time of 3–5 minutes, which is generally desired. Using such an amount of water and a tetraalkoxysilane material of the preferred $SiO_2$ content, the time required to attain a mold having sufficient green strength for removal from the permanent pattern becomes primarily a function of the quantity of guanidine carbonate employed, although the age of the binder must be considered.

The refractories employed in the practice of the invention can be of substantially any type. Among suitable materials are grog (pulverized fire clay), silica, fused silica, zircon, sillimanite, alumina, bauxite, calcined clay and mullite or combinations thereof. As to the sizing of the refractory particles, conventional practices are followed.

Particularly good refractory combinations for the ceramic shell process are afforded by mixtures of zircon and fused silica used in the ratios 1:3 to 3:1. Such mixtures are employed in the preparation of the slurries incorporating the binder and are applied in conjunction with a fused silica stucco. The zircon gives the casting an improved surface, a benefit apparently owing to the fact that zircon is not wetted by the metal. In addition, zircon when present in the refractory mixture provides better packing of the slurry during drying. The advantage following from the use of the fused silica resides principally in the fact that the casting is thereby rendered more leachable, which is to say that the vestigal refractory material remaining on the casting following the breaking off of the bulk of the mold is more readily removed by the usual chemical means.

Zircon can also be used with benefit in the practice of the permanent pattern process. For example, there has been used with excellent results a mixture comprising 60–70% zircon flour plus 30–40% zircon of mixed particle size (small and large). Up to 60% fused silica may be substituted in these mixtures for better leachability.

In general, to obtain optimum mold strength with no cracking, it is necessary to carefully adjust the ratio of refractory to binder as dictated by the amount of fines present and the absorptivity of the refractory.

In carrying out the ceramic shell process in the manner of the present invention, the guanidine carbonate solution is added to the stucco refractory or a portion thereof—not to the slurry containing the binder. The solution involves so little water that the stucco may be immediately fluidized (compressed air) thereafter. The stucco refractory which is relatively coarse is applied between the binder-refractory investments to provide a relatively rough surface assuring good adhesion between such investments. The quanidine carbonate when present on the stucco refractory causes substantially instant gelling of the binder deposited on the wax pattern from the preceding dipping in the binder-refractory slurry. It is particularly important that the guanidine carbonate be present on the stucco refractory applied following the first dipping in the binder-refractory slurry. This prevents sloughing off of such first coat on re-dipping in the binder-refractory slurry, as has been often previously experienced. The quanidine carbonate may or may not be present on the stucco refractory in which the work is immersed following subsequent applications of the binder-refractory investment material. Where a high strength mold is required it is best to omit guanidine carbonate from the stucco refractory used in the second and subsequent stucco refractory investments. On the other hand, if ease of removal of the mold from the casting is desired and a high strength mold is not essential a single stucco containing the quanidine carbonate may be used for all coats.

The number of alternate dippings in the binder-refractory investment and the stucco refractory investment is determined by the strength required in the mold, which is to say the higher the strength requirement the more dippings. As just indicated, the number of dippings required in the case of a high strength mold may be reduced if the guanidine carbonate is employed only in the first stucco refractory dip. Where the stucco contains the guanidine carbonate only about four minutes need elapse before the next immersion in the slurry. On the other hand, if the stucco contains no gelation agent the working period conventional for the particular slurry should be observed.

After the last investment has been applied the mold is allowed to set for a period of time varying between ½–4 days, whereafter heat is applied to melt the wax pattern. With the wax removed, the mold is fired as in the permanent pattern process to remove all volatiles.

The invention is further illustrated by the accompanying examples which are not to be taken as in anyway limitative thereof.

EXAMPLE I

| Binder | Parts (by wt.) |
|---|---|
| Ethyl silicate (40% $SiO_2$ content) | 45.0 |
| Ethyl alcohol | 49.6 |
| Water | 5.3 |
| 37% aqueous solution of hydrochloric acid | 0.1 |

The above components were mixed in the order listed and the mixture allowed to age for three days. The resulting binder had an $SiO_2$ content of 18%, a pH of 1.7 and was upwards of 80% hydrolyzed. A first portion of the binder was mixed with 325 mesh milled zircon refractory, used in an amount giving a viscosity of 25–45 seconds on a Zahn No. 4 cup (No. 1 slurry). A second portion of the binder was mixed with 200 mesh milled zircon employed in a quantity giving a viscosity of 6–10 seconds on the Zahn No. 4 cup (No. 2 slurry).

An investment layer of the No. 1 slurry was applied to a wax pattern by dipping the pattern in such slurry. Immediately thereafter, the pattern was immersed in a fluidized bed of stucco refractory (40–100 mesh fused silica) which had been treated with a 10% aqueous solution of guanidine carbonate. This prevented any sloughing off of the No. 1 slurry investment. It was calculated that the stucco comprised 0.75 part by weight of the guanidine carbonate.

The procedure as described was continued with alternate dippings in the No. 2 slurry and a second stucco refractory which had not been treated with the guanidine carbonate solution.

The mold as finally processed out gave excellent detail when applied in the casting of a steel part.

EXAMPLE II

The process of Example I was repeated except that in lieu of the zircon refractory there was used in both slurry No. 1 and No. 2 a 25–75 mixture of zircon and fused silica. Similar results were achieved.

EXAMPLE III

The process of Example I was repeated except that the alcohol content of the binder was increased to reduce the SiO content to about 9%. The resultant mold was found adequate for a light weight aluminum casting.

EXAMPLE IV

The process of Example I was repeated with inclusion of the guanidine carbonate gelation agent in each stucco application. The mold possessed less strength than Example I, but again was found adequate for the aluminum casting. Subsequent to the casting operation, it was found that the mold could be easily removed simply by cracking and brushing. This presents a substantial advantage, since aluminum castings cannot be chemically treated in the manner of steel castings to remove vestigal refractory from recesses, reentrant corners etc.

EXAMPLE V

The process of Example I was repeated with both the No. 1 and No. 2 slurries being prepared using mullite refractory. The two stuccos were each constituted of calcined clay. Such material was found quite receptive to guanidine carbonate. The results were essentially the same as in Example I.

EXAMPLE VI

Example I was repeated substituting alumina refractory in the slurries and using a mullite stucco. The results were essentially the same.

EXAMPLE VII

The process was repeated with substitution of South American bauxite as the slurry refractory. The stucco used in each stucco immersion was guanidine carbonate-coated calcined clay. The mold was found excellent for both an aluminum and a light steel casting. No chemical treatment of either casting was required to remove vestigal refractory material.

EXAMPLE VIII

Example I was repeated using a binder based on tetra-isopropoxysilane. Results were comparable.

EXAMPLE IX

A refractory mixture consisting of seventy percent 150 mesh zircon flour and thirty percent 6–50 mesh zircon was coated with guanidine carbonate applied as a 10% solution in a quantity such as to provide about 0.1–0.35% guanidine carbonate on the refractory particles.

The thus coated refractory was mixed with a tetra-ethoxysilane binder which was 84% hydrolyzed. The resulting slurry had a working time of about 3 minutes. When poured over a permanent pattern with brushing the slurry gelled in about 5 minutes. Thereafter the mold was removed and fired at 2000° F. The finished mold was quite smooth and dimensionally perfect, representing an exact conformance with the contours of the pattern.

EXAMPLE X

Example IX was repeated using a binder based on tetra-isopropoxysilane and a refractory mixture of the following composition: 30 percent calcined clay and 70 percent mullite of which, based on U.S. Sieve Series, 2 percent remains on a 100 mesh sieve, 12 percent remains on a 140 mesh sieve, 25 percent remains on a 200 mesh sieve, 37 percent remains on a 270 mesh sieve, 43 percent remains on a 225 mesh sieve and the balance passes a 325 mesh sieve. As to the 30% calcined clay, 7 percent remains on an 8 mesh sieve, 34 percent remains on a 12 mesh sieve, 64 percent remains on a 16 mesh sieve, 81 percent remains on a 20 mesh sieve, 94 percent remains on a 30 mesh sieve, 98 percent remains on a 40 mesh sieve and the balance remains on a 50 mesh sieve. The refractory mixture was coated with the guanidine carbonate to the extent of nearly 1% on the total weight of the refractory.

The results were similar to Example IX.

It will, of course, be understood that the improvement herein is applicable to modifications of both the ceramic shell and permanent pattern processes. Thus, in the case of the permanent pattern process it is now common practice as a matter of economics to employ, where feasible, in lieu of using only alkyl-silicate-bonded refractory a preformed sodium silicate-bonded refractory mold disposed in spaced relation to the permanent pattern. This preformed mold has therein both a pore hole and a vent. In use, the tetraalkoxysilane-bonded refractory investment is introduced through the pore hole into the space between the preformed mold and the pattern facing. In this way, the advantages following from the use of tetra-alkoxysilane binder are gained using less of such binder than would otherwise be required.

The invention being thus described and illustrated, what is claimed is:

1. In the preparation of a mold using a refractory material, the improvement which resides in coating such material with guanidine carbonate and thereafter effecting bonding of the refractory particles by incorporating therewith a binder comprising a hydrolyzed tetraalkoxysilane having 1 to 4 carbon atoms in the alkoxy group.

2. Method of claim 1 where the hydrolyzed tetraalkoxysilane is tetraethoxysilane.

3. A refractory material adapted for use in the preparation of a mold comprising particles coated with guanidine carbonate.

4. The method of practicing the ceramic shell mold making process which comprises incorporating in at least one stucco a refractory material having particles coated with guanidine carbonate.

5. The method of practicing the permanent pattern mold making process which comprises coating at least a portion of the refractory particles with guanidine carbonate.

6. In the preparation of a mold using a refractory material, the improvement which resides in intermixing such material with an aqueous solution of guanidine carbonate and thereafter effecting bonding of the refractory particles through the employment of a binder incorporating a hydrolyzed tetraalkoxysilane having 1 to 4 carbon atoms in the alkoxy group.

7. Method according to claim 6 where the hydrolyzed tetraalkoxysilane is tetraethoxysilane.

8. Method according to claim 7 where the guanidine carbonate solution is employed in an amount providing from about .01 to about 5 weight percent guanidine carbonate based on total refractory.

9. Method according to claim 8 as practiced using an 8–12% aqueous solution of guanidine carbonate.

10. Method according to claim 6 where the tetraalkoxysilane is from about 65 to 95% hydrolyzed and the aqueous quanidine carbonate is employed in an amount providing as a coating on the refractory particles from about .01 to about 5 weight percent guanidine carbonate based on total refractory.

11. A comminuted refractory material adapted for use in the preparation of a mold, the particles of such material being coated with guanidine carbonate, such compound being present in an amount accounting for between about 0.1 and about 5% of the total weight of the refractory material.

12. A comminuted refractory material adapted for use in the preparation of a mold, the particles of such material being coated with guanidine carbonate, such compound being present in an amount accounting for between about 0.75 and about 1.25% of the total weight of the refractory material.

13. A comminuted refractory material adapted for use in the preparation of a mold, the particles of such material being coated with guanidine carbonate, such compound being present in an amount accounting for between about .05 and about 3.5% of the total weight of the refractory material.

14. The method of practicing the permanent pattern mold making process which comprises coating the refractory particulate with guanidine carbonate employed in such an amount as to account for from .075 to 1.25% of the total weight of the refractory and thereafter effecting bonding of the particulate with a binder incorporating a tetraalkoxysilane pre-hydrolyzed to the extent of from 75 to 85%, said tetraalkoxysilane having 1 to 4 carbon atoms in the alkoxy group.

15. Method according to claim 14 where the tetraalkoxysilane is tetraethoxysilane.

16. The method of practicing the ceramic shell mold making process which comprises incorporating in at least one stucco a refractory material coated with guanidine carbonate present in an amount accounting for from .05 to 3.5% of the weight of the refractory material, said stucco being utilized with a binder-refractory slurry in which the binder incorporates a tetraalkoxysilane pre-hydrolyzed to the extent of from about 65 ot about 95%, said tetraalkoxysilane having 1 to 4 carbon atoms in the alkoxy group.

17. Process according to claim 16 where the pre-hydrolyzed tetraalkoxysilane is tetraethoxysilane.

References Cited

UNITED STATES PATENTS

| | | | |
|---|---|---|---|
| 3,226,784 | 1/1966 | Owen et al. | 106—38.35 XR |
| 3,232,771 | 2/1966 | Pearce | 106—38.35 |
| 3,309,212 | 3/1967 | Lubalin | 106—38.3 XR |
| 3,314,806 | 4/1967 | Emblem et al. | 106—38.2 |

JULIUS FROME, *Primary Examiner.*

U.S. Cl. X.R.

106—38.3, 287, 57, 69

UNITED STATES PATENT OFFICE
CERTIFICATE OF CORRECTION

Patent No. 3,428,465　　　　　　　　　　　　　February 18, 1969

Gordon Donald McLeod

It is certified that error appears in the above identified patent and that said Letters Patent are hereby corrected as shown below:

Column 2, line 46, "0.1" should read -- .01 --. Column 7, line 13, "0.75" should read -- .075 --.

Signed and sealed this 24th day of March 1970.

(SEAL)
Attest:

Edward M. Fletcher, Jr.
Attesting Officer

WILLIAM E. SCHUYLER, JR
Commissioner of Patents